(12) United States Patent
Hashimoto et al.

(10) Patent No.: US 10,090,723 B2
(45) Date of Patent: Oct. 2, 2018

(54) STATOR AND MANUFACTURING METHOD OF STATOR

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Shingo Hashimoto, Okazaki (JP); Hiroyuki Tanaka, Anjo (JP); Takanori Ota, Anjo (JP); Shingo Sato, Okazaki (JP); Daichi Kurashige, Nishio (JP); Hirotaka Kawaura, Toyota (JP); Norihiko Akao, Nissin (JP)

(73) Assignees: AISIN AW CO., LTD., Anjo (JP); TOYOTA JIDOSHA KABUSHIKI KASHA, Toyota (JP)

( * ) Notice: Subject to any disclaimer, the term of this patent is extended or adjusted under 35 U.S.C. 154(b) by 773 days.

(21) Appl. No.: 14/405,695

(22) PCT Filed: Apr. 18, 2013

(86) PCT No.: PCT/JP2013/061500
§ 371 (c)(1),
(2) Date: Dec. 4, 2014

(87) PCT Pub. No.: WO2013/190894
PCT Pub. Date: Dec. 27, 2013

(65) Prior Publication Data
US 2015/0155750 A1 Jun. 4, 2015

(30) Foreign Application Priority Data
Jun. 22, 2012 (JP) ................................. 2012-140993

(51) Int. Cl.
*H02K 3/28* (2006.01)
*H02K 1/02* (2006.01)
*H02K 15/02* (2006.01)
*H02K 3/52* (2006.01)
*H02K 15/00* (2006.01)
*H02K 15/04* (2006.01)

(52) U.S. Cl.
CPC ................. *H02K 3/28* (2013.01); *H02K 1/02* (2013.01); *H02K 15/02* (2013.01); *H02K 3/522* (2013.01);
(Continued)

(58) Field of Classification Search
CPC ............ H02K 3/522; H02K 3/50; H02K 3/52; H02K 2203/09; H02K 3/28; H02K 15/00; H02K 3/18
(Continued)

(56) References Cited

U.S. PATENT DOCUMENTS 8,269,387 B2 * 9/2012 Endo ...................... H02K 3/522
310/194
2005/0108870 A1 5/2005 Harada et al.
(Continued)

FOREIGN PATENT DOCUMENTS

JP 2005-160143 A 6/2005
JP 2005-310566 A 11/2005
(Continued)

OTHER PUBLICATIONS

JP 2008312290 A machine translation Jun. 25, 2017.*
Feb. 13, 2017 European Search Report issued in Patent Application No. 13806361.5.

*Primary Examiner* — Michael Andrews
*Assistant Examiner* — Leda Pham
(74) *Attorney, Agent, or Firm* — Oliff PLC

(57) ABSTRACT

A three phase stator configured with phases that are U-phase, V-phase, and W-phase. The stator is configured such that a bus bar portion includes a joint that is formed at an end and is joined to a terminal portion of a different one of the coils. A connecting portion is formed between the joint portion and the winding portion. In the coils, a first coil and a second coil serve as the two coils joined to each other by the joint
(Continued)

portion of the bus bar portion of the first coil and the terminal portion of the second coil, and ends of the terminal portions of middle coils are the coils disposed between the first coil and the second coil are located at a height closer to the stator core than the connecting portion of the first coil in a direction of a central axis of the stator core.

21 Claims, 13 Drawing Sheets

(52) U.S. Cl.
 CPC ......... *H02K 15/0081* (2013.01); *H02K 15/04* (2013.01); *H02K 2203/06* (2013.01); *Y10T 29/49009* (2015.01)

(58) Field of Classification Search
 USPC .......................................... 310/71, 179, 184
 See application file for complete search history.

(56) References Cited

U.S. PATENT DOCUMENTS

| 2008/0093948 | A1 | 4/2008 | Naganawa | |
| 2008/0174199 | A1* | 7/2008 | Ishigami | H02K 3/12 |
| | | | | 310/199 |
| 2008/0179983 | A1 | 7/2008 | Hasegawa et al. | |
| 2009/0200888 | A1* | 8/2009 | Tanaka | H02K 3/12 |
| | | | | 310/195 |
| 2010/0170084 | A1 | 7/2010 | Hasegawa et al. | |
| 2010/0187936 | A1 | 7/2010 | Hasegawa et al. | |
| 2010/0201212 | A1* | 8/2010 | Urano | H02K 3/18 |
| | | | | 310/71 |
| 2010/0207467 | A1 | 8/2010 | Urano et al. | |
| 2011/0175483 | A1* | 7/2011 | Koike | H02K 3/12 |
| | | | | 310/201 |
| 2012/0262014 | A1* | 10/2012 | Katou | H02K 3/28 |
| | | | | 310/71 |

FOREIGN PATENT DOCUMENTS

| JP | A-2008-104293 | | 5/2008 | |
| JP | 2008-187877 | A | 8/2008 | |
| JP | 2008312290 | A * | 12/2008 | ............... H02K 3/18 |
| JP | 2009-100626 | A | 5/2009 | |
| JP | A-2009-219343 | | 9/2009 | |
| JP | A-2010-110122 | | 5/2010 | |
| JP | 2010-141965 | A | 6/2010 | |
| JP | 2010-141967 | A | 6/2010 | |
| JP | A-2011-151953 | | 8/2011 | |
| JP | A-2011-223827 | | 11/2011 | |
| JP | A-2013-5541 | | 1/2013 | |

* cited by examiner

STATOR AND MANUFACTURING METHOD OF STATOR

TECHNICAL FIELD

Aspects of preferred embodiments are directed to a stator for a rotary electric machine that has coils disposed in a plurality of slots of a stator core and a method of manufacturing the stator.

BACKGROUND ART

As a related art of a stator for a rotary electric machine (motor), Patent Document 1 discloses a stator in which adjacent coils of the same phase are connected by a connecting wire (bus bar portion) extended from one end of a coil wire (conductor) forming a coil.

RELATED ART DOCUMENT

Patent Document

[Patent Document 1] Japanese Patent Application Publication No. 2010-110122 (JP 2010-110122 A)

SUMMARY

However, in the stator disclosed in Patent Document 1, a stator core is formed such that the coil wire is mounted on a core member that is formed by punching so as to be split in a circumferential direction, and the core member having the coil wire mounted thereon is arranged in the circumferential direction. Here, distortion occurs in a punched portion of the core member, thereby providing resistance to magnetic field and increasing a loss of motor output. Therefore, in order to obtain a desired motor output, it is necessary to increase the whole size of the stator at least by the loss of the motor output. This may increase the size of the stator.

In addition, one end portion of the coil wire is formed to extend in a direction that matches a direction of a central axis of the stator core (in a direction where the coil wires disposed in slots of the stator core are formed). Therefore, a joint part of the one end portion of the coil wire and a connecting wire is formed at a high position in the direction of the central axis of the stator core. In addition, it is necessary to secure a work space for welding between the one end portion of the coil wire and the connecting wire such that the welding operation does not affect the coil wire and a connection wire of a different coil of the coils, etc. Therefore, the height of a coil end is extremely increased in the direction of the central axis of the stator core, thereby increasing the size of the stator in the direction of the central axis thereof.

Aspects of preferred embodiments solve the above problems, by providing a stator capable of achieving reduction in size of the stator in a direction of a central axis thereof and a method of manufacturing the stator.

Means for Solving the Problem

An aspect of preferred embodiments to solve the problems are characterized by a stator which includes an annular stator core, and a plurality of coils that are mounted on the stator core and each include a winding portion formed by winding a conductor in a loop shape, a bus bar portion extended from one end of the winding portion, and a terminal portion extended from the other end of the winding portion, and in which the coils are formed of three phases, that is, U-phase, V-phase, and W-phase. In the stator, the bus bar portion includes a joint portion that is formed at an end of the bus bar portion and is joined to the terminal portion of a different one of the coils, and a connecting portion that is formed between the joint portion and the winding portion, and in the coils of each of the three phases that are U-phase, V-phase, and W-phase, a first coil and a second coil that serve as the two coils joined to each other are joined to each other by the joint portion of the bus bar portion of the first coil and the terminal portion of the second coil, and ends of the terminal portions of middle coils that are the coils disposed between the first coil and the second coil are located at a height closer to the stator core than the connecting portion of the first coil in a direction of a central axis of the stator core.

According to the aspect, in the coils of each of the three phases, that is, U- phase, V-phase and W-phase, ends of the terminal portions of middle coils that are disposed between the first coil and the second coil joined to each other are located at a height closer to the stator core than the connecting portion of the first coil in the direction of the central axis of the stator core. Therefore, the connecting portion of the first coil is located at a height as close to the stator core as possible in the direction of the central axis of the stator core, whereby the height of the connecting portion can be reduced. Accordingly, a height of a coil end can be reduced, thereby reducing the size of the stator in the direction of the central axis thereof.

In addition, the bus bar portions of the middle coils are molded into desired shapes using a molding die in advance, and then, the middle coils can be mounted on the teeth of the stator core from the inner side of the inner periphery of the stator core while the terminal portions of the middle coils are passed under the connecting portion of the first coil. Thus, in each coil, the bus bar portion is molded into a desired shape in advance, and then, the coil can be mounted on a tooth of the stator core from the inner side of the inner periphery of the stator core while the terminal portion is passed under the connecting portion of the bus bar portion of a different one of the coils. Accordingly, the positional accuracy of the joint portions of the bus bar portions of the coils mounted on the stator core is stabilized, whereby the bus bar portions can be reliably joined to the terminal portions. Therefore, the coils can be reliably connected with each other by the bus bar portion, thereby improving the productivity of the stator.

In the aspect, it is preferable that in the coils of each of the three phases that are U-phase, V-phase, and W-phase, each of the coils be formed such that an end of the terminal portion is located at a height closer to the stator core than the connecting portion in the direction of the central axis of the stator core.

According to the aspect, the commonality of the coils to be mounted on the stator core can be achieved, thereby reducing the cost.

In the aspect, it is preferable that in the coils of each of the three phases that are U-phase, V-phase, and W-phase, the terminal portion of each of the coils be formed so as to be tilted with respect to the direction of the central axis of the stator core.

According to the aspect, a joint part of the bus bar portion and the terminal portion can be located at a lower height in the direction of the central axis of the stator core, whereby the connecting portion of the coil can be located at a lower height in the direction of the central axis of the stator core.

Thus, the height of the coil end can be reduced, thereby reducing the size of the stator in the direction of the central axis thereof.

In the aspect, it is preferable that the joint portion include a downward portion extending from the connecting portion toward an end face of the stator core, a bottom portion extending from an end of the downward portion along the end face of the stator core, and an upward portion extending from an end of the bottom portion in a direction away from the end face of the stator core.

According to the aspect, a clearance between the connecting portion of the bus bar portion and the winding portion can be secured as much as possible, thereby improving the insulation performance of the stator.

In the aspect, it is preferable that the terminal portion be formed inward of an outer end face of the winding portion in a radial direction of the stator core.

According to the aspect, the terminal portion is not protruded from the winding portion toward the back yoke side of the stator core. Therefore, when the coils are sealed with resin after the coils are mounted on the stator core, the coils can be reliably sealed with resin even if the width of the back yoke is small. In addition, when the stator is incorporated into a motor, a clearance between the joint part of the bus bar portion and the terminal portion and a case can be sufficiently secured, thereby improving the insulation performance of the motor.

In the aspect, it is preferable that the terminal portion be formed such that an end of the terminal portion is located at a height closer to the stator core than an axial end face of the winding portion in the direction of the central axis of the stator core.

According to the aspect, the terminal portion is not protruded outside from the winding portion in the direction of the central axis of the stator core, thereby effectively reducing the height of the joint part of the bus bar portion and the terminal portion in the direction of the central axis of the stator core. Therefore, the height of the coil end in the direction of the central axis of the stator core can be effectively reduced. Accordingly, the stator can be effectively reduced in size in the direction of the central axis thereof.

In the aspect, it is preferable that the stator core be molded integrally in a circumferential direction.

According to the aspect, a loss of the motor output is not produced. Therefore, a desired motor output can be obtained while reducing the whole size of the stator. This can reduce the size of the stator.

In the aspect, it is preferable that the bus bar portion be extended from an end of the winding portion that is an end on an inner side in the radial direction of the stator core, and the terminal portion be extended from an end of the winding portion that is an end on an outer side in the radial direction of the stator core.

According to the aspect, the joint part of the bus bar portion and the terminal portion can be formed at an outer position in the radial direction of the stator core. Accordingly, the rotor that is assembled to the inner side of the inner periphery of the stator core 10 does not interfere with the joint part of the bus bar portion and the terminal portion. This improves the ease of assembly of the rotor.

Another aspect of preferred embodiments are characterized by a method of manufacturing a stator which includes an annular stator core, and a plurality of coils that are mounted on the stator core and each include a winding portion formed by winding a conductor in a loop shape, a bus bar portion extended from one end of the winding portion, and a terminal portion extended from the other end of the winding portion, and in which the coils are formed of three phases, that is, U-phase, V-phase, and W-phase. The method includes: when manufacturing the stator in which the bus bar portion includes a joint portion that is formed at an end of the bus bar portion and is joined to the terminal portion of a different one of the coils, and a connecting portion that is formed between the joint portion and the winding portion, and in the coils of each of the three phases that are U-phase, V-phase, and W-phase, a first coil and a second coil that serve as the two coils joined to each other are joined to each other by the joint portion of the bus bar portion of the first coil and the terminal portion of the second coil, and ends of the terminal portions of middle coils that are the coils disposed between the first coil and the second coil are located at a height closer to the stator core than the connecting portion of the first coil in a direction of a central axis of the stator core, inserting the coils into slots of the stator core from an inner side of an inner periphery of the stator core.

According to the aspect, in the coils of each of the three phases, that is, U-phase, V-phase and W-phase, ends of the terminal portions of middle coils that are disposed between the first coil and the second coil joined to each other are located at a height closer to the stator core than the connecting portion of the first coil in the direction of the central axis of the stator core. Therefore, the connecting portion of the first coil is located at a height as close to the stator core as possible in the direction of the central axis of the stator core, whereby the height of the connecting portion can be reduced. Accordingly, a height of a coil end can be reduced, thereby reducing the size of the stator in the direction of the central axis thereof.

In addition, the bus bar portions of the middle coils are molded into desired shapes using a molding die in advance, and then, the middle coils can be mounted on the teeth of the stator core from the inner side of the inner periphery of the stator core while the terminal portions of the middle coils are passed under the connecting portion of the first coil. Thus, in each coil, the bus bar portion is molded into a desired shape in advance, and then, the coil can be mounted on the tooth of the stator core from the inner side of the inner periphery of the stator core while the terminal portion is passed under the connecting portion of the bus bar portion of a different one of the coils. Accordingly, the positional accuracy of the joint portions of the bus bar portions of the coils mounted on the stator core is stabilized, whereby the bus bar portions can be reliably joined to the terminal portions. Therefore, the coils can be reliably connected with each other by the bus bar portion, thereby improving the productivity of the stator.

Effects of Preferred Embodiments

According to a stator having this structure and a method of manufacturing the stator, the stator can be reduced in size in the direction of the central axis thereof.

Figure 1:
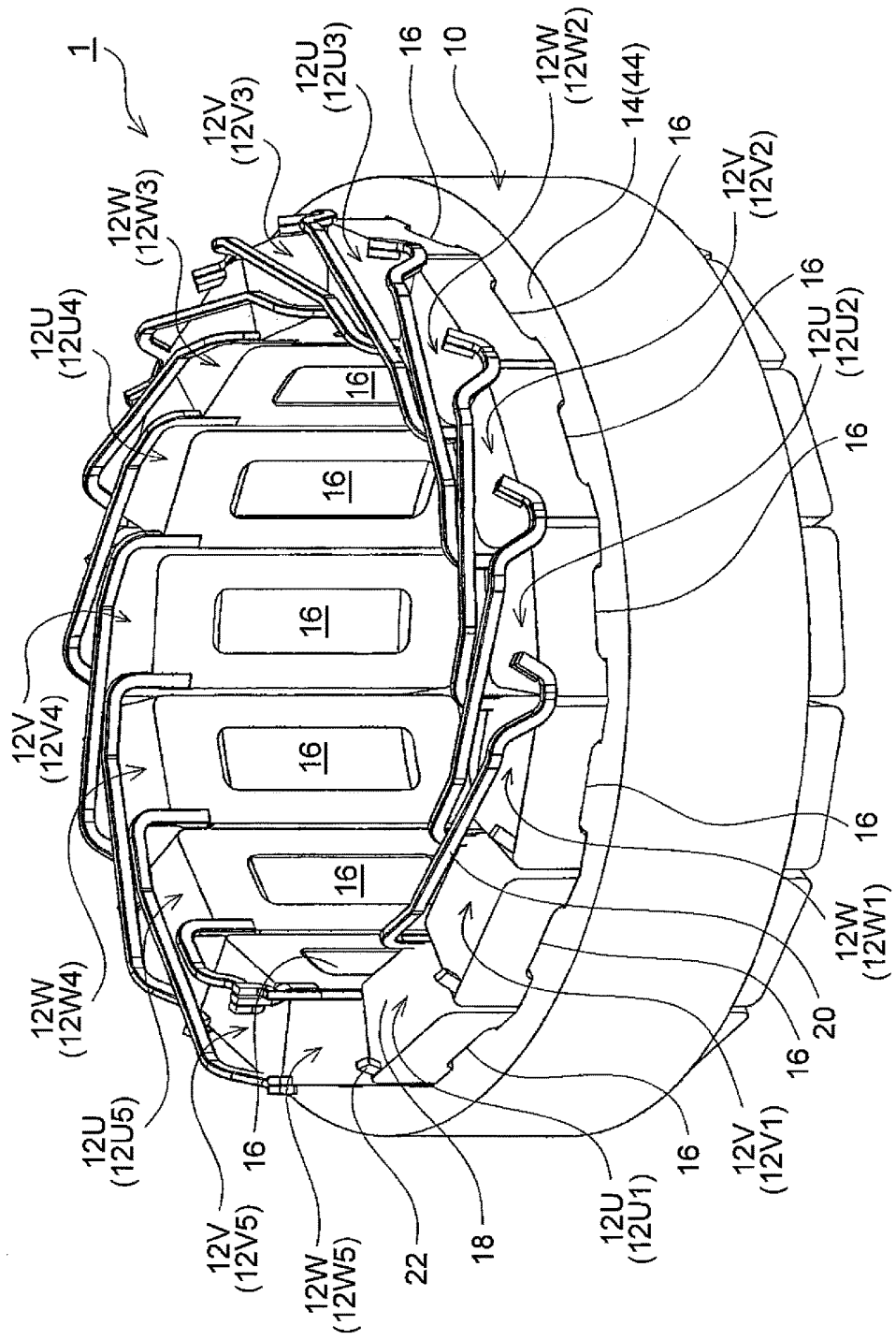
FIG. 1 is a perspective view showing the appearance of a stator according to a first embodiment.

MODES FOR CARRYING OUT THE INVENTION (First Embodiment)

First, a stator 1 (stator) according to a first embodiment will be described. As shown in FIGS. 1 to 4, the stator 1 has a stator core 10, coils 12 (coils 12U, coils 12V, and coils 12W), etc.

The stator core 10 is formed in an annular shape and includes a back yoke 14 and teeth 16. The stator core 10 is molded integrally in the circumferential direction thereof. The back yoke 14 is formed in an annular shape on an outer peripheral portion of the stator core 10. The plurality of teeth 16 are formed so as to protrude radially inward from an inner periphery of the back yoke 14. A slot (not shown) is formed between adjacent ones of the teeth 16.

Figure 5:
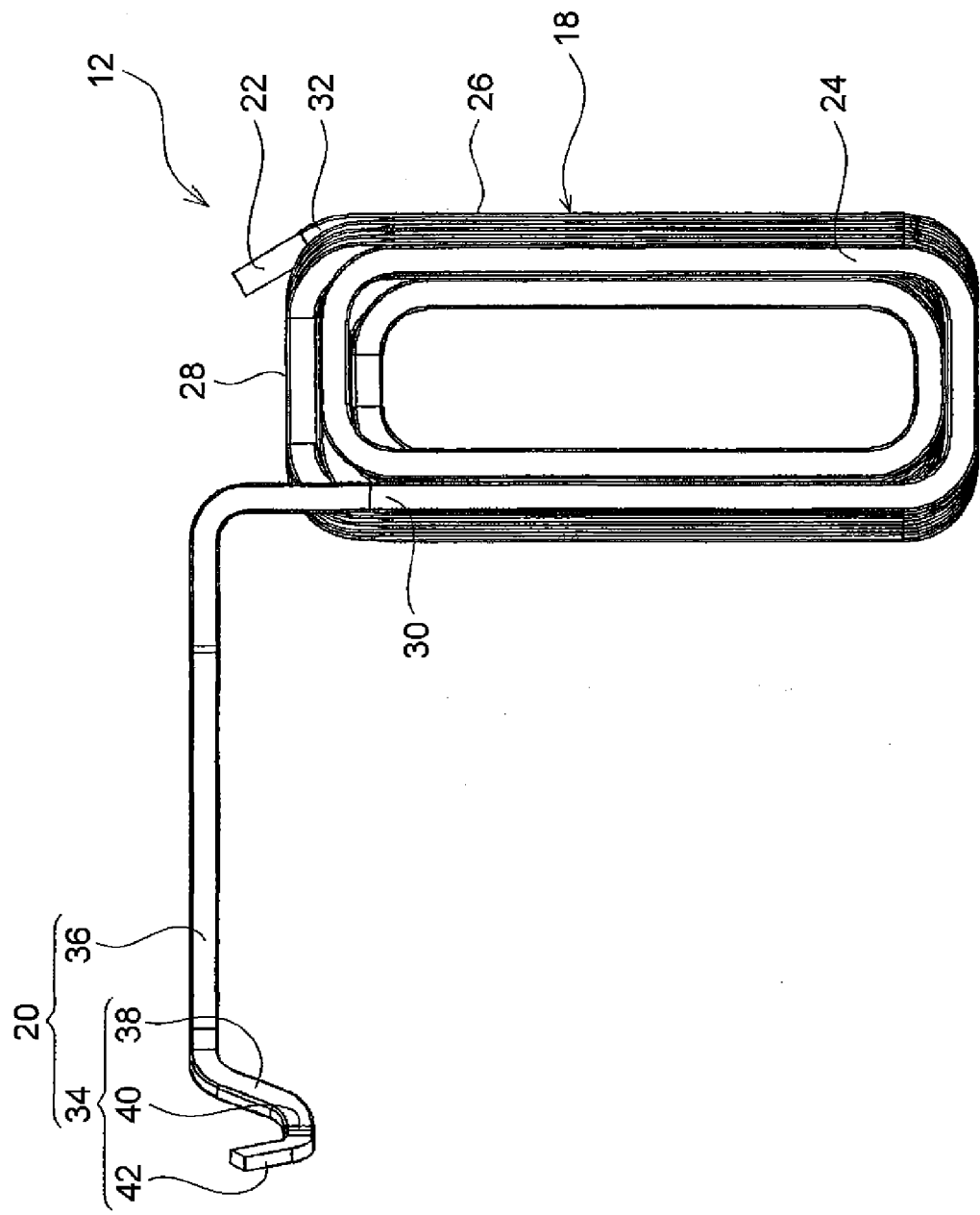
FIG. 5 is a view (front view) showing a single coil according to the first embodiment.

The plurality of coils 12 are mounted so as to be concentratedly wound around the teeth 16 of the stator core 10 via an insulator of an insulating member (not shown). A surface of a rectangular conductor forming the coil 12 is enameled in order to ensure the insulation between adjacent rectangular conductors. In this embodiment, as an example, the coil 12 is an edgewise coil as shown in FIG. 5. The "edgewise coil" is a coil shaped by winding the rectangular conductor while bending the rectangular conductor in a short-side direction of a rectangular cross-section of the rectangular conductor such that one of the short sides of the rectangular cross-section serves as an inner diameter surface and the other of the short sides serves as an outer diameter surface. The coil 12 is a two-layer coil formed by winding the rectangular conductor in two layers, that is, an inner layer and an outer layer, in the example shown in FIG. 5. The coil 12 is not limited to the two-layer coil and may be a single-layer coil formed by winding the rectangular conductor in a single layer or may be a three-layer coil formed by winding the rectangular conductor in three layers.

The coils 12 include U-phase coils 12U, V-phase coils 12V, and W-phase coils 12W. The U-phase coils 12U, the V-phase coils 12V, and the W-phase coils 12W are arranged sequentially in the repeated pattern of the U-phase coil 12U, the V-phase coil 12V, and the W-phase coil 12W in a circumferential direction of the stator core 10. The U-phase coils 12U, the V-phase coils 12V, and the W-phase coils 12W are mounted on the teeth 16 of the stator core 10 such that the coils 12 of the same phase are arranged at intervals. The adjacent ones of the coils 12 of the same phase (the same phase out of U-phase, V-phase, and W-phase) are electrically connected to each other.

In the example shown in FIG. 1, the stator 1 includes U-phase coils 12U1, 12U2, 12U3, 12U4, 12U5, V-phase coils 12V1, 12V2, 12V3, 12V4, 12V5, and W-phase coils 12W1, 12W2, 12W3, 12W4, 12W5. The U-phase coils, the V-phase coils, and the W-phase coils are arranged in the order of the U-phase coil 12U1, the V-phase coil 12V1, the W-phase coil 12W1, the U-phase coil 12U2, the V-phase coil 12V2, the W-phase coil 12W2, ..., the U-phase coil 12U5, the V-phase coil 12V5, and the W-phase coil 12W5 in the circumferential direction of the stator core 10.

More specifically, the coil 12 includes a winding portion 18, a bus bar portion 20, a terminal portion 22, etc. as shown in FIGS. 1 to 5. In FIGS. 1 to 4, the winding portion 18 is illustrated in a simple way.

The winding portion 18 is a portion formed by winding the rectangular conductor in a loop shape and stacking the loops of the rectangular conductor. Specifically, the winding portion 18 includes an inner end face 24, an outer end face 26, an axial end face 28, an inner end 30, an outer end 32, etc.

The inner end face 24 is an end face facing the stacking direction of the rectangular conductors. The inner end face 24 is disposed on an inner side in a radial direction of the stator core 10 when the coil 12 is mounted on the stator core 10. The outer end face 26 is an end face facing the stacking direction of the rectangular conductors. The outer end face 26 is disposed on an outer side in the radial direction of the stator core 10 when the coil 12 is mounted on the stator core 10. The axial end face 28 is an end face facing the direction of the central axis of the stator core 10 when the coils 12 are mounted on the stator core 10. The axial end face 28 is formed on a side where the bus bar portion 20 and the terminal portion 22 are formed (lead side). When the coil 12 is a two layer coil or a three layer coil, the axial end face 28 corresponds to an outer periphery of the rectangular conductor in the outermost layer in the lead-side coil end.

The inner end 30 is an end of the rectangular conductor forming the winding portion 18. The inner end 30 is disposed on an inner side in the radial direction of the stator core 10 when the coils 12 are mounted on the stator core 10. The outer end 32 is an end of the rectangular conductor forming the winding portion 18. The outer end 32 is disposed on an outer side in the radial direction of the stator core 10 when the coils 12 are mounted on the stator core 10.

The bus bar portion 20 is a portion formed by extending the rectangular conductor from the inner end 30 of the winding portion 18. The bus bar portion 20 electrically connects the adjacent ones of the coils 12 of the same phase. In the example shown in FIG. 1, the bus bar portion 20 extends toward the outer side in the radial direction of the stator core 10 from the inner end 30 of the winding portion 18 of one U-phase coil 12U (for example, 12U1) as it gets closer to a different one (for example, 12U2) of the U-phase coils 12U that is located adjacent thereto, and is connected to the terminal portion 22 of the different U-phase coil 12U. The bus bar portions 20 are connected between the V-phase coils 12V and between the W-phase coils 12W in the same manner, Specifically, the bus bar portion 20 includes a joint portion 34 and a connecting portion 36. The joint portion 34 is a portion formed in an end portion of the bus bar portion 20 and is joined to the terminal portion 22 of a different one of the coils 12 (the coil 12 of the same phase that is located adjacent thereto). The connecting portion 36 is formed between the joint portion 34 and the winding portion 18.

The terminal portion 22 is a portion formed by extending the rectangular conductor from the outer end 32 of the winding portion 18. An enamel coating of the rectangular conductor is removed in the terminal portion 22. The terminal portion 22 is joined to the joint portion 34 of the bus bar portion 20 of a different one of the coils 12 of the same phase that is located adjacent thereto.

In an example shown in FIG. 1, in the stator 1, a neutral point is formed by connecting the inner end 30 of the U-phase coil 12U5, the inner end 30 of the V-phase coil 12V5, and the inner end 30 of the W-phase coil 12W5. In addition, an external wiring (not shown) is connected to each of the terminal portion 22 of the U-phase coil 12U1, the terminal portion 22 of the V-phase coil 12V1, and the terminal portion 22 of the W-phase coil 12W1.

Figure 2:
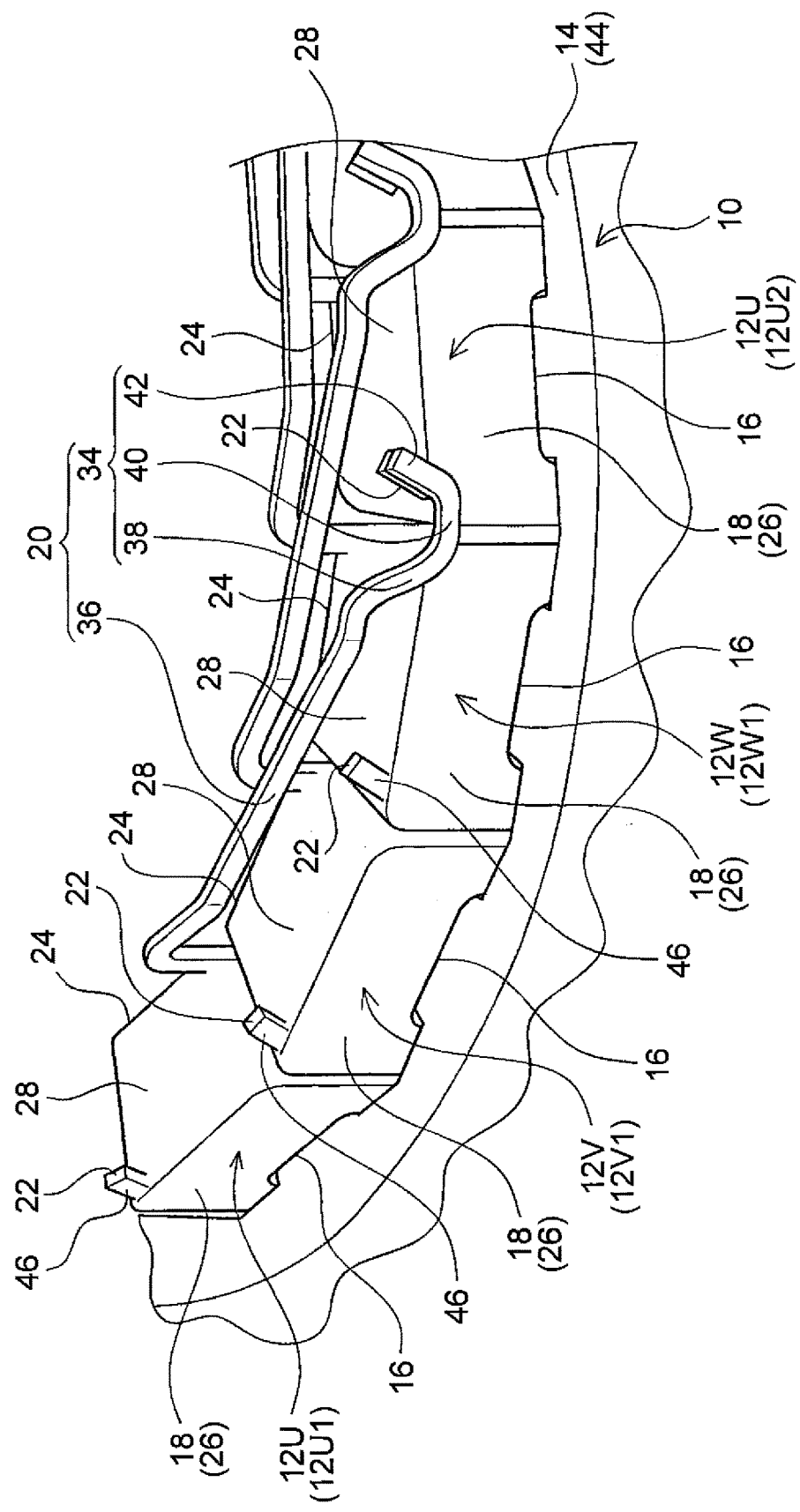
FIG. 2 is an enlarged view showing a main part of FIG. 1.
Figure 4:
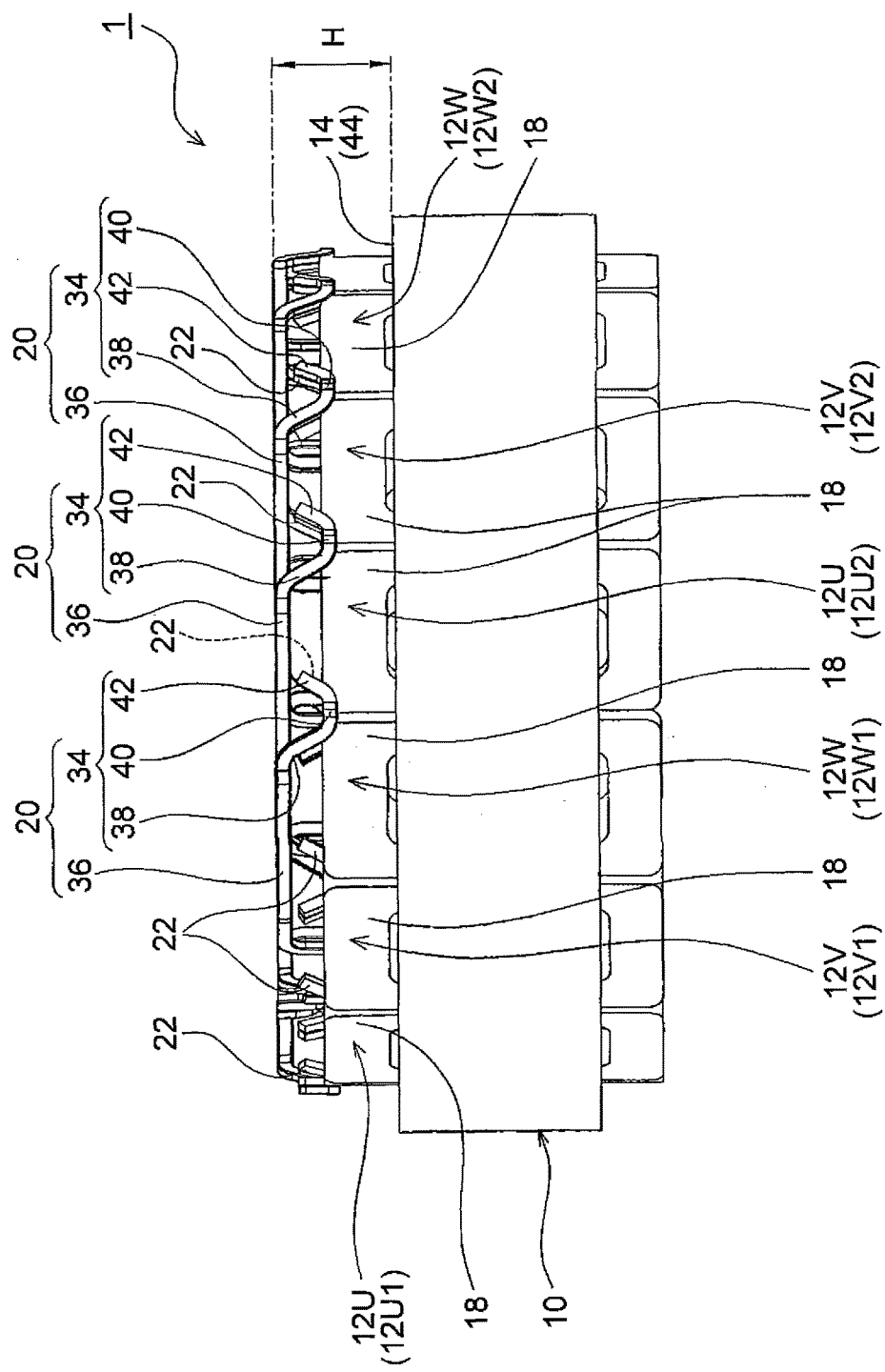
FIG. 4 is a side view showing the stator according to the first embodiment.

In this embodiment, as shown in FIGS. 4 and 5, in the coils 12 of each of the three phases, that is, U-phase, V-phase, and W-phase, each coil 12 is formed such that an end of the terminal portion 22 is located at a height closer to the stator core 10 than the connecting portion 36 of the bus bar portion 20 in the direction of the central axis of the stator core 10 (in the up-down direction of FIG. 4 or FIG. 5). Therefore, as shown in FIG. 2, etc., the ends of the terminal portions 22 of the V-phase coil 12V1 and the W-phase coil 12W1 that are disposed between the U-phase coil 12U1 and the U-phase coil 12U2 are located at a height closer to the stator core 10 than the connecting portion 36 of the U-phase coil 12U1 in the direction of the central axis of the stator core 10.

In the coils 12 of each of the three phases, that is, U-phase, V-phase, and W-phase, the terminal portion 22 is formed so as to be tilted with respect to the direction of the central axis of the stator core 10. That is, the direction of the central axis of the terminal portion 22 does not match the direction of the central axis of the stator core 10 and is tilted with respect to the direction of the central axis of the stator core 10.

Specifically, the joint portion 34 of the bus bar portion 20 includes a downward portion 38, a bottom portion 40, and an upward portion 42 as shown in FIGS. 4 and 5. The downward portion 38 is a portion extending from the connecting portion 36 toward an end face 44 of the stator core 10. The bottom portion 40 is a portion extending from an end of the downward portion 38 (an end on the lower side in FIG. 4) along the end face 44 of the stator core 10.

The upward portion 42 is a portion extending from an end of the bottom portion 40 (an end on the right side in FIG. 4) in a direction away from the end face 44 of the stator core 10. An enamel coating of the rectangular conductor is removed in the upward portion 42. The upward portion 42 is located at a position closer to the stator core 10 than the connecting portion 36 in the direction of the central axis of the stator core 10 (in the up-down direction of FIG. 4).

The upward portion 42 is tilted with respect to the direction of the central axis of the stator core 10. That is, the direction of the central axis of the upward portion 42 does not match the direction of the central axis of the stator core 10 and is tilted with respect to the direction of the central axis of the stator core 10 so as to extend along the direction of the central axis of the terminal portion 22. The upward portion 42 is joined to the terminal portion 22 of a different coil 12 of the coils 12 of the same phase that is adjacent thereto.

The stator 1 having the above structure is manufactured by mounting the coils 12, of which the bus bar portions 20 and the terminal portions 22 are molded into desired shapes as shown in FIG. 5 using a molding die in advance, on the teeth 16 via the insulator from an inner side of an inner periphery of the stator core 10 and inserting the coils 12 into the slots. At this time, the terminal portions 22 of the coils 12 can be passed under the connecting portion 36 of the bus bar portion 20 of a different one of the coils 12 that is located adjacent thereto such that the coils 12 are mounted on the stator core 10. For example, the terminal portions 22 of the V-phase coil 12V1 and the W-phase coil 12W1 can be passed under the connecting portion 36 of the U-phase coil 12U1, and the V-phase coil 12V1 and the W-phase coil 12W1 are inserted into the slots of the stator core 10 such that the coils 12 are mounted on the stator core 10.

The stator 1 of the first embodiment described above has the following advantages. A first coil 12 (for example, the U-phase coil 12U1) and a second coil 12 (for example, the U-phase coil 12U2), which are joined to each other, are connected with each other by the joint portion 34 of the bus bar portion 20 of the first coil 12 and the terminal portion 22 of the second coil 12. In the coils 12 of each of the three phases, that is, U-phase, V-phase and W-phase, the ends of the terminal portions 22 of middle coils 12 that are disposed between the first coil 12 and the second coil 12 (for example, the V-phase coil 12V1 and the W-phase coil 12W1) are located at a height closer to the stator core 10 than the connecting portion 36 of the first coil 12 in the direction of the central axis of the stator core 10. Therefore, the connecting portion 36 of the first coil 12 is located at a height as close to the stator core 10 as possible in the direction of the central axis of the stator core 10, whereby the height of the connecting portion 36 can be reduced. Accordingly, a height H (see FIG. 4) of a coil end can be reduced, thereby reducing the size of the stator 1 in the direction of the central axis thereof (in the up-down direction in FIG. 4).

When the stator 1 is manufactured, the bus bar portions 20 of the middle coils 12 are molded into desired shapes using a molding die in advance, and then, the middle coils 12 can be mounted on the teeth 16 of the stator core 10 from the inner side of the inner periphery of the stator core 10 while the terminal portions 22 of the middle coils 12 are passed under the connecting portion 36 of the first coil 12. Thus, in each coil 12, the bus bar portion 20 is molded into a desired shape in advance, and then, the coil 12 can be mounted on the tooth 16 of the stator core 10 from the inner side of the inner periphery of the stator core 10 while the terminal portion 22 is passed under the connecting portion 36 of the bus bar portion 20 of a different one of the coils 12. Accordingly, the positional accuracy of the joint portions 34 of the bus bar portions 20 of the coils 12 mounted on the teeth 16 of the stator core 10 is stabilized, whereby the bus bar portions 20 can be stably joined to the terminal portions 22. Therefore, the coils 12 can be reliably connected with each other by the bus bar portions 20, thereby improving the productivity of the stator 1.

In the coils 12 of each of the three phases, that is, U-phase, V-phase, and W-phase, the end of the terminal portion 22 of each coil 12 is located at a height closer to the stator core 10 than the connecting portion 36 in the direction of the central axis of the stator core 10. Therefore, the commonality of the coils 12 to be mounted on the stator core 10 can be achieved, thereby reducing the cost.

In the coil 12s of each of the three phases, that is, U-phase, V-phase, and W-phase, the terminal portion 22 of each coil 12 is tilted with the respect to the direction of the central axis of the stator core 10. Therefore, the joint part of the bus bar portion 20 and the terminal portion 22 can be located at a lower height in the direction of the central axis of the stator core 10, whereby the connecting portion 36 of the coil 12 can be located at a lower height in the direction of the central axis of the stator core 10. Thus, the height H of the coil end can be reduced, thereby reducing the size of the stator 1 in the direction of the central axis thereof. In addition, a work space for welding of the bus bar portion 20 and the terminal portion 22 can be secured.

Because the terminal portion 22 is tilted with the respect to the direction of the central axis of the stator core 10, the length of the terminal portion 22, in which enamel coating of the rectangular conductor is removed, can be sufficiently long. Therefore, during welding of the bus bar portion 20 and the terminal portion 22, the enamel coating of the rectangular conductor can be protected from heat generated by welding.

The joint portion 34 of the bus bar portion 20 includes the downward portion 38 extending from the connecting portion 36 toward the end face 44 of the stator core 10, the bottom portion 40 extending from the end of the downward portion 38 along the end face 44 of the stator core 10, and the upward portion 42 extending from the end of the bottom portion 40 in the direction away from the end face 44 of the stator core 10. Therefore, a clearance between the connecting portion 36 of the bus bar portion 20 and the winding portion 18 can be secured as much as possible, thereby improving the insulation performance of the stator 1.

Figure 3:
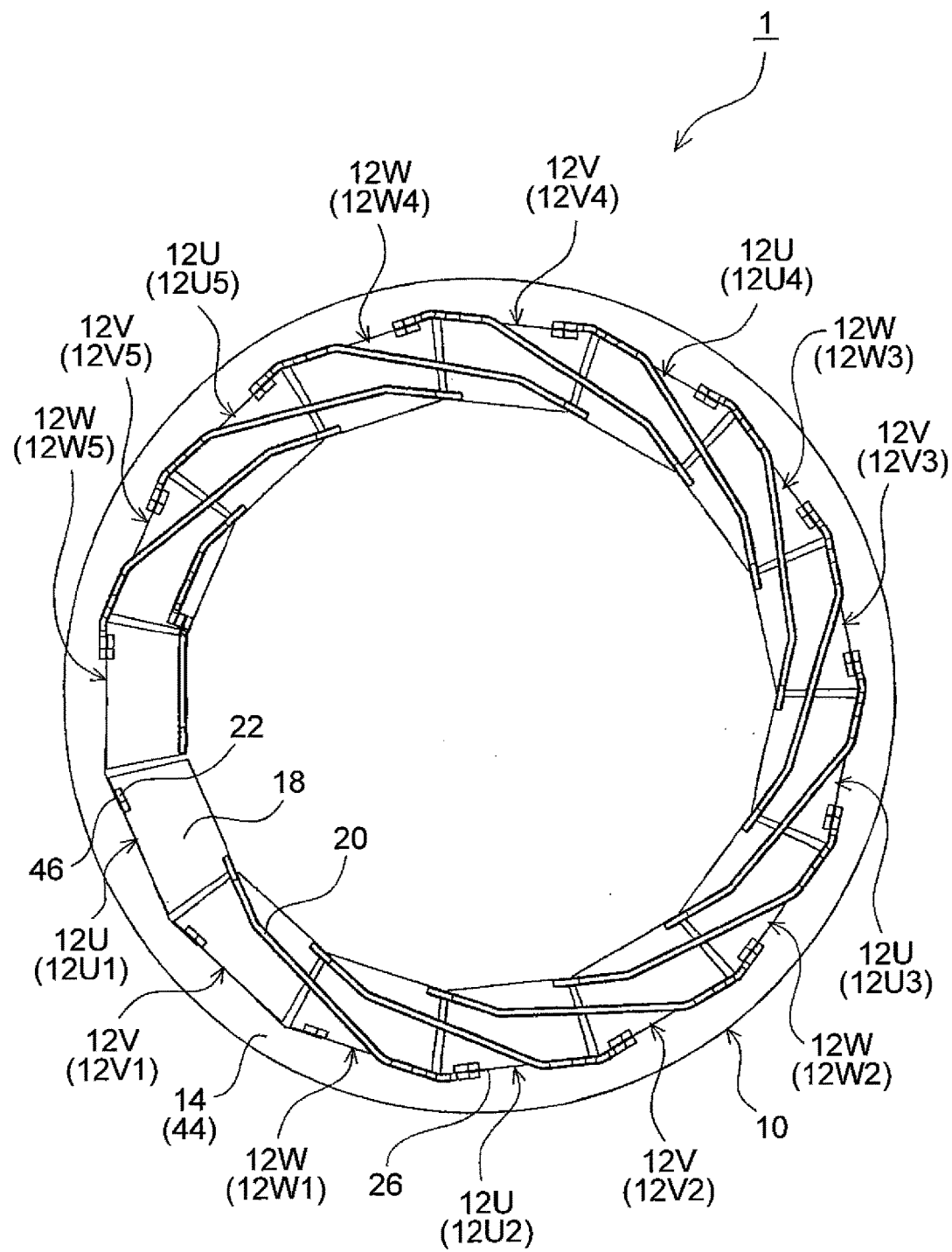
FIG. 3 is a top view showing the stator according to the first embodiment.
Figure 6:
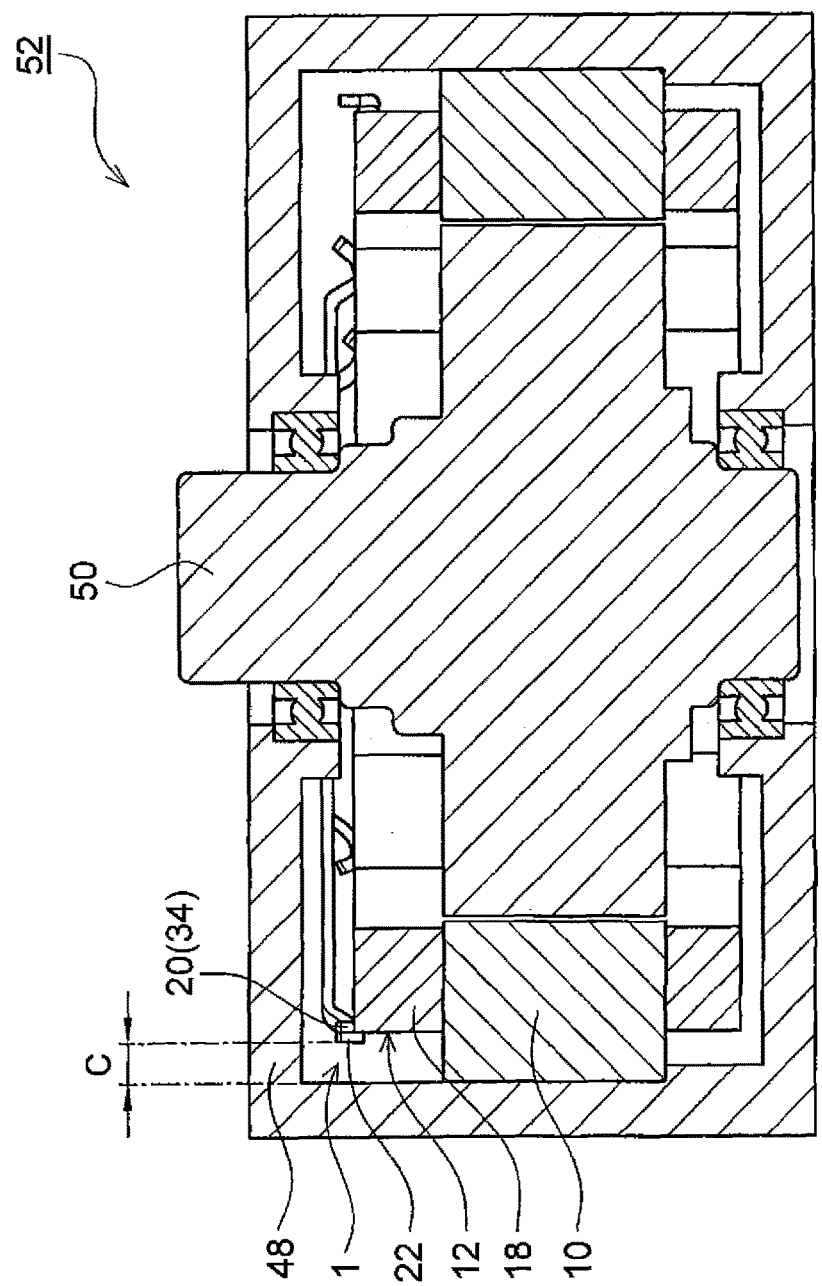
FIG. 6 is a sectional view schematically showing a motor.
Figure 7:
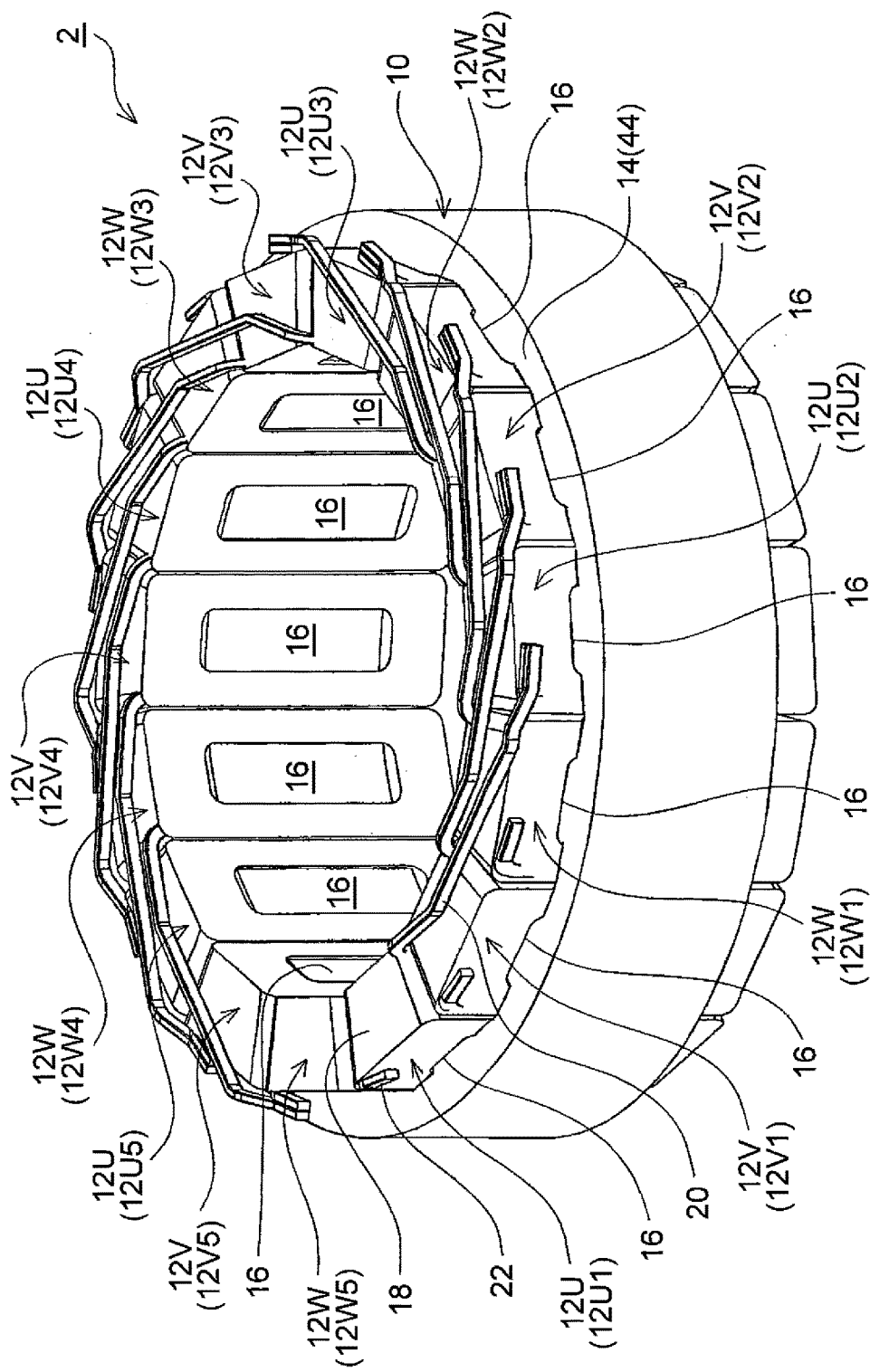
FIG. 7 is a perspective view showing the appearance of a stator according to a second embodiment.
Figure 8:
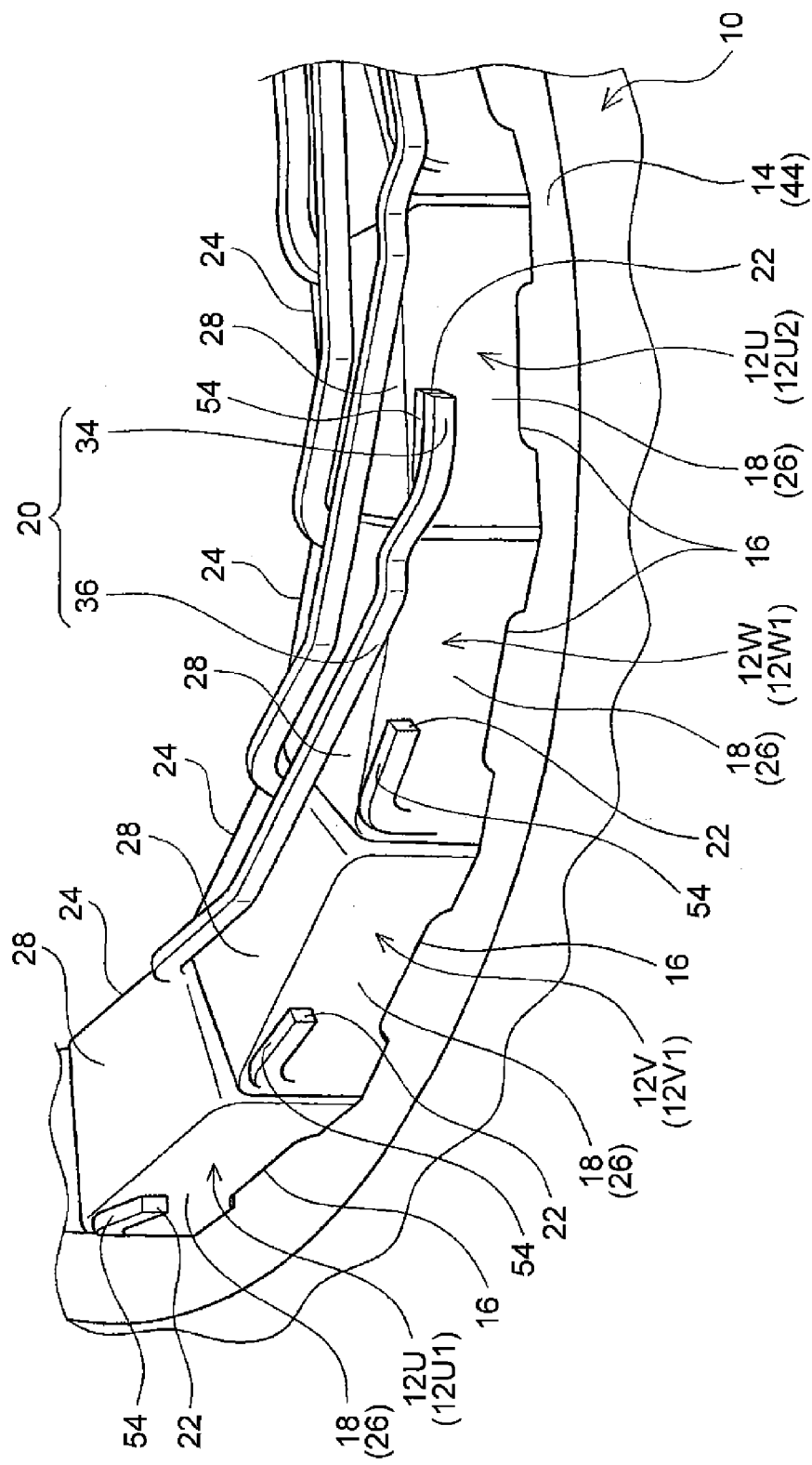
FIG. 8 is an enlarged view showing a main part of FIG. 7.
Figure 9:
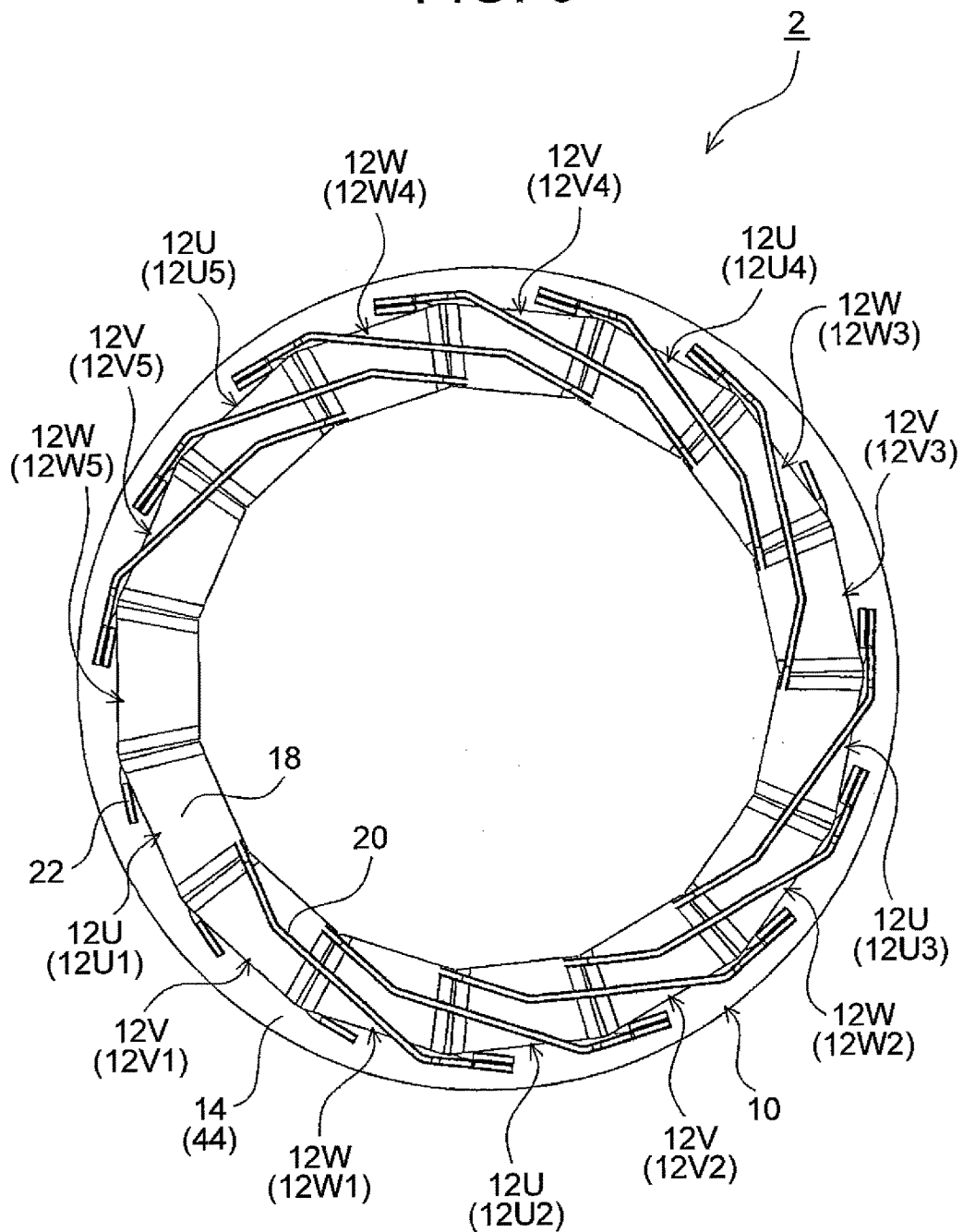
FIG. 9 is a top view showing the stator according to the second embodiment.

The terminal portion 22 is formed inward of the outer end face 26 of the winding portion 18 in the radial direction of the stator core 10. Specifically, as shown in FIGS. 2 and 3, an outer periphery 46 of the terminal portion 22 and the outer end face 26 of the winding portion 18 are located at the same position in the radial direction of the stator core 10. Thus, the terminal portion 22 is not protruded from the winding portion 18 toward the back yoke 14 side of the stator core 10. Therefore, even if the width of the back yoke 14 is small, the coils 12 can be reliably sealed with resin after the coils 12 are mounted on the stator core 10. In addition, as shown in FIG. 6, when the stator 1 is incorporated into a motor 52, a clearance C between the joint part of the bus bar portion 20 and the terminal portion 22 and a case 48 can be sufficiently secured, thereby improving the insulation performance of the motor 52. FIG. 6 is a sectional view schematically showing the motor 52 that is manufactured by arranging the stator 1 together with a rotor 50 in the case 48. In FIG. 6, resin for sealing the coils 12 is omitted.

The stator core 10 is molded integrally in the circumferential direction, whereby a loss of the motor output, which is produced when the stator core including a plurality of core members is used as in Patent Document 1, is not produced. Therefore, a desired motor output can be obtained while reducing the whole size of the stator 1. This can reduce the size of the stator 1.

The bus bar portion 20 is formed by extending the rectangular conductor from the inner end 30 of the winding portion 18 that is the end located on the inner side in the radial direction of the stator core 10. The terminal portion 22 is formed by extending the rectangular conductor from the outer end 32 of the winding portion 18 that is the end located on the outer side in the radial direction of the stator core 10. Accordingly, the joint part of the bus bar portion 20 and the terminal portion 22 can be formed at an outer position in the radial direction of the stator core 10. Accordingly, the rotor 50 (see FIG. 6) that is assembled to the inner side of the inner periphery of the stator core 10 does not interfere with the joint part of the bus bar portion 20 and the terminal portion 22. This improves the ease of assembly of the rotor 50.

As a modification of the first embodiment, an embodiment may be possible in which the bus bar portion 20 is formed by extending the rectangular conductor from the outer end 32 of the winding portion 18, and the terminal portion 22 is formed by extending the rectangular conductor from the inner end 30 of the winding portion 18.

(Second Embodiment)

Next, a stator 2 according to a second embodiment will be described. Elements similar to those of the first embodiment are denoted with the same reference numerals, and description thereof will be omitted. Structures different from those of the first embodiment will be mainly described.

In this embodiment, as shown FIGS. 7 to 10, the terminal portion 22 of the coil 12 is formed to extend approximately along the circumferential direction of the stator core 10 and perpendicular to the direction of the central axis of the stator core 10. That is, the direction of the central axis of the terminal portion 22 does not match the direction of the central axis of the stator core 10 and is tilted perpendicularly to the direction of the central axis of the stator core 10. FIG. 11 is a view (perspective view) of the single coil 12.

Figure 10:
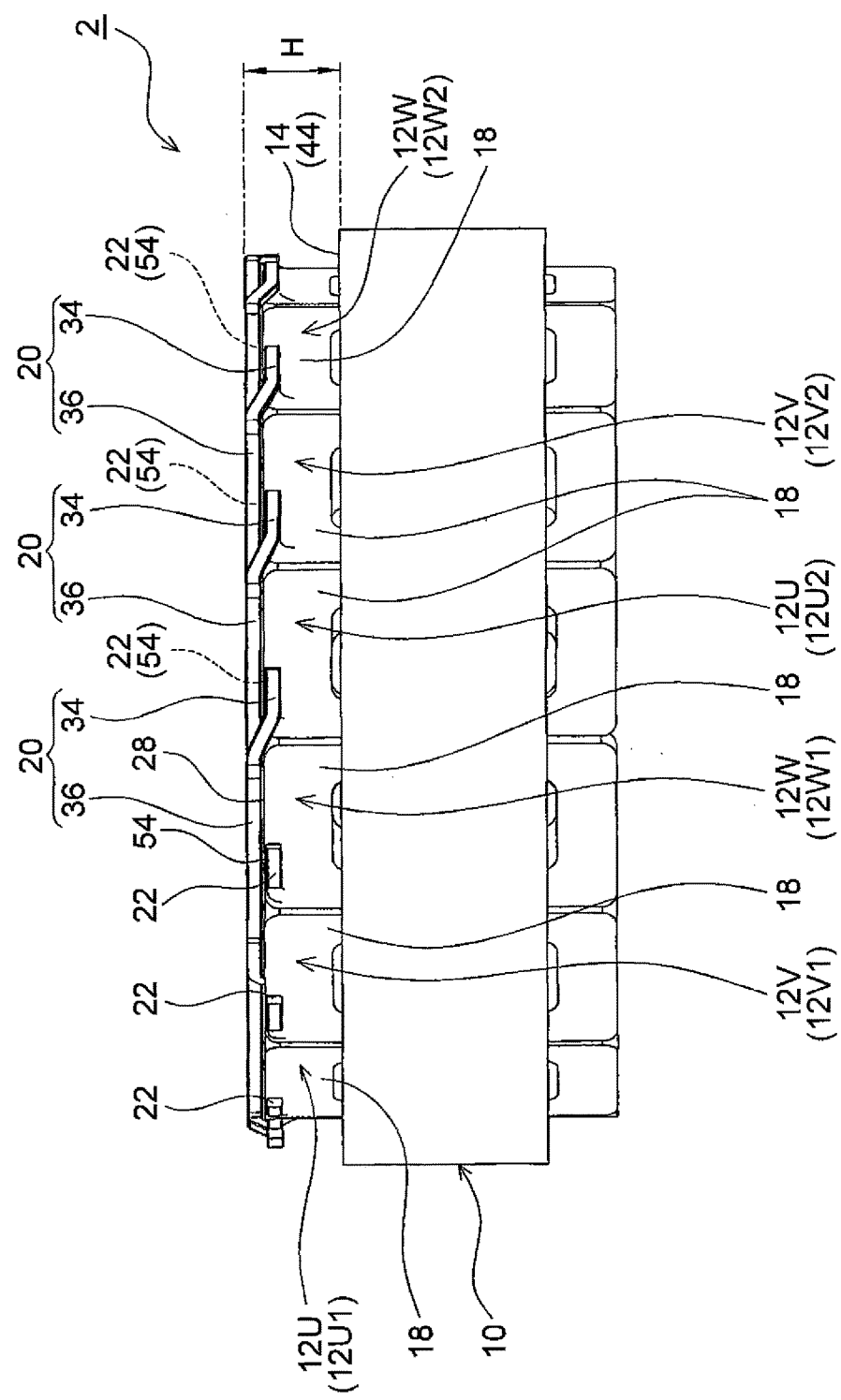
FIG. 10 is a side view showing the stator according to the second embodiment.
Figure 11:
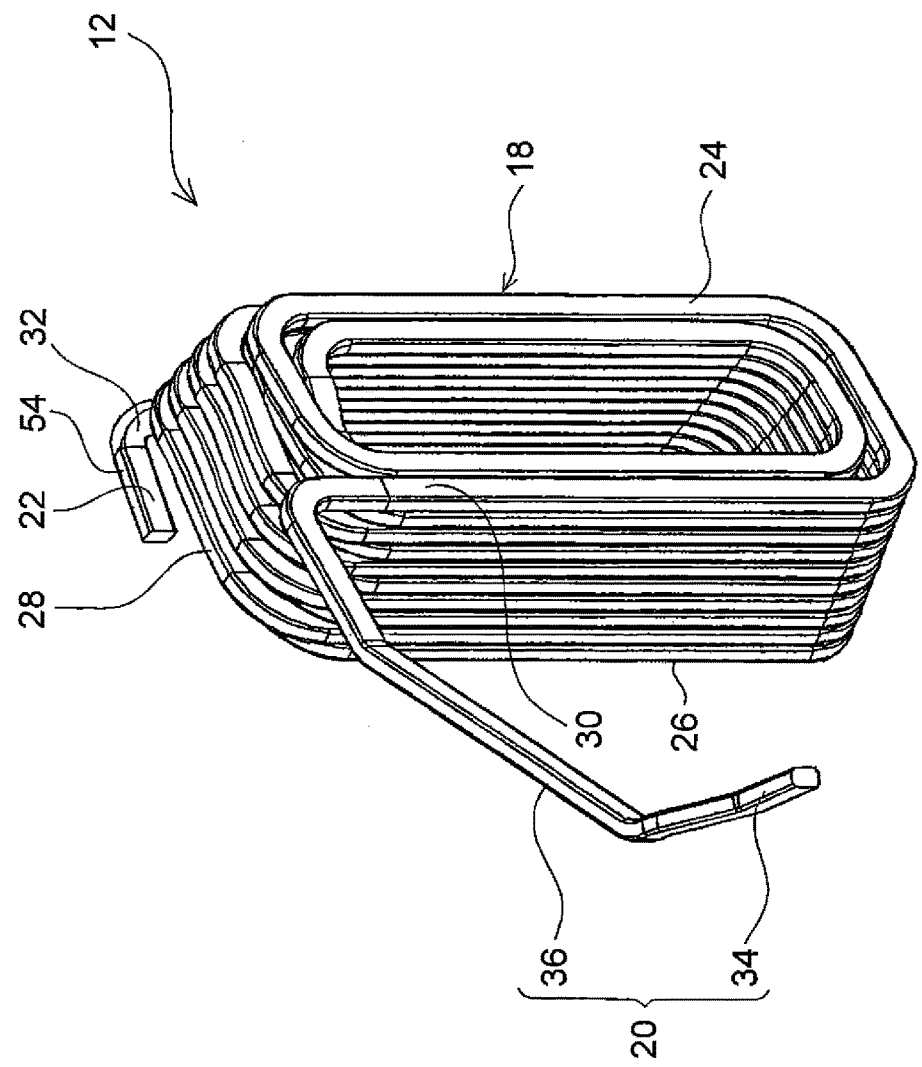
FIG. 11 is a view (perspective view) showing a single coil according to the second embodiment.

As shown in FIG. 10, the end of the terminal portion 22 is located at a height closer to the stator core 10 than an axial end face 28 of the winding portion 18 in the direction of the central axis of the stator core 10 (in the up-down direction in FIG. 10). Specifically, an upper surface 54 (a surface on an upper side in FIG. 10) of the terminal portion 22 and the axial end face 28 of the winding portion 18 are located at the same position in the direction of the central axis of the stator core 10. The connecting portion 36 of the bus bar portion 20 is formed on or above (on the upper side in FIG. 10) the axial end face 28 of the winding portion 18. Thus, the terminal portion 22 is located at a position closer to the stator core 10 than the connecting portion 36 in the direction of the central axis of the stator core 10.

The connecting portion 36 and the axial end face 28 of the winding portion 18 are formed with a slight clearance interposed therebetween or are formed so as to contact with each other.

The stator 2 having the above structure according to this embodiment has the following advantages in addition to the advantages of the first embodiment. The stator 2 is formed such that the end of the terminal portion 22 is located at a height closer to the stator core 10 than the axial end face 28 of the winding portion 18 in the direction of the central axis of the stator core 10. Specifically, as shown in FIG. 10, the upper surface 54 of the terminal portion 22 and the axial end face 28 of the winding portion 18 are located at the same position in the direction of the central axis of the stator core 10. Thus, the terminal portion 22 is not protruded outside from the winding portion 18 in the direction of the central axis of the stator core 10, thereby effectively reducing the height of the joint part of the bus bar portion 20 and the terminal portion 22 in the direction of the central axis of the stator core 10. Therefore, the height H (see FIG. 10) of the coil end can be effectively reduced. Accordingly, the stator 2 can be effectively reduced in size in the direction of the central axis thereof (the up-down direction in FIG. 10).

The connecting portion 36 of the bus bar portion 20 and the axial end face 28 of the winding portion 18 are formed with a slight clearance interposed therebetween or are formed to contact with each other, thereby effectively reducing the height H of the coil end.

Figure 12:
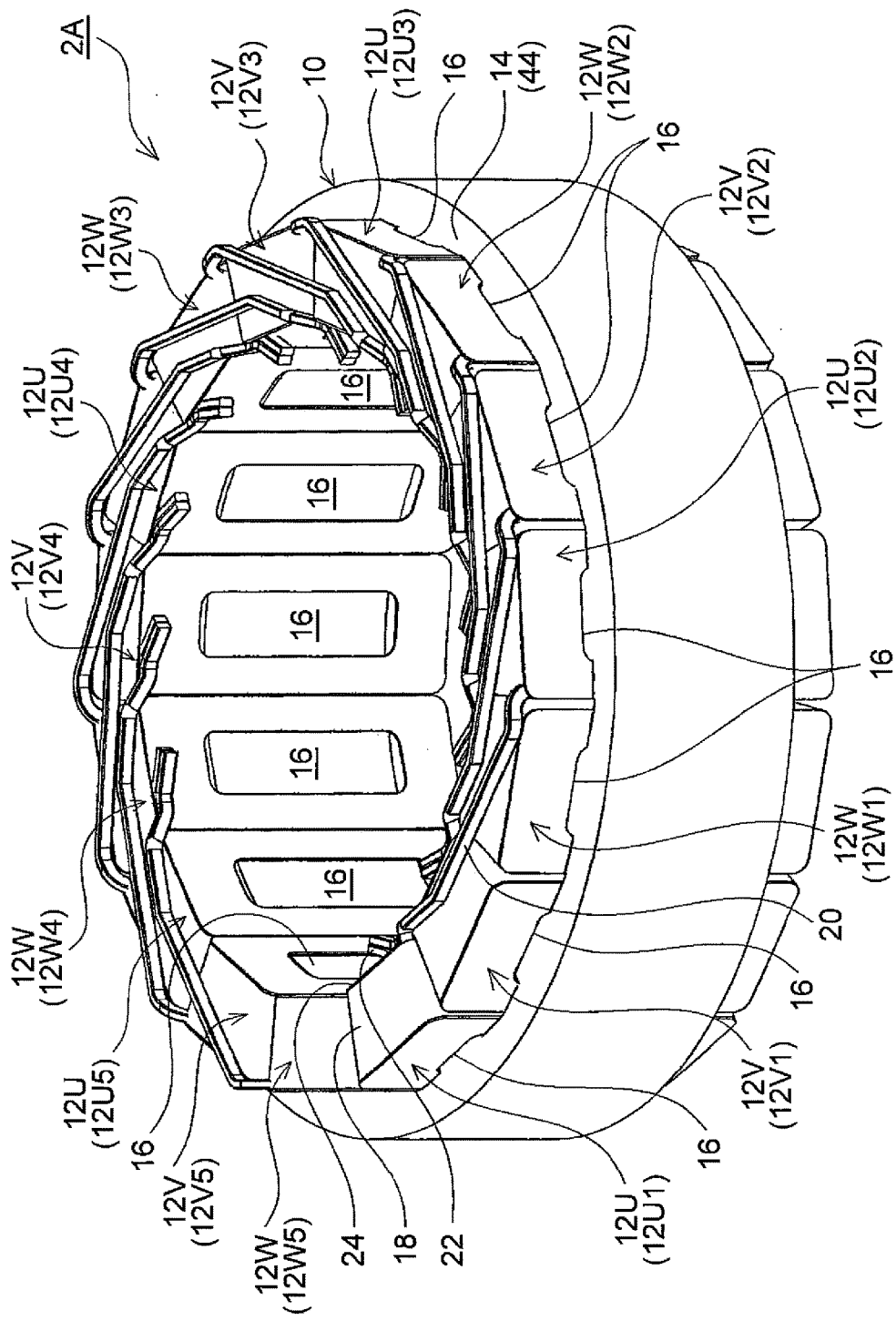
FIG. 12 is a perspective view showing the appearance of a stator according to a modification of the second embodiment.
Figure 13:
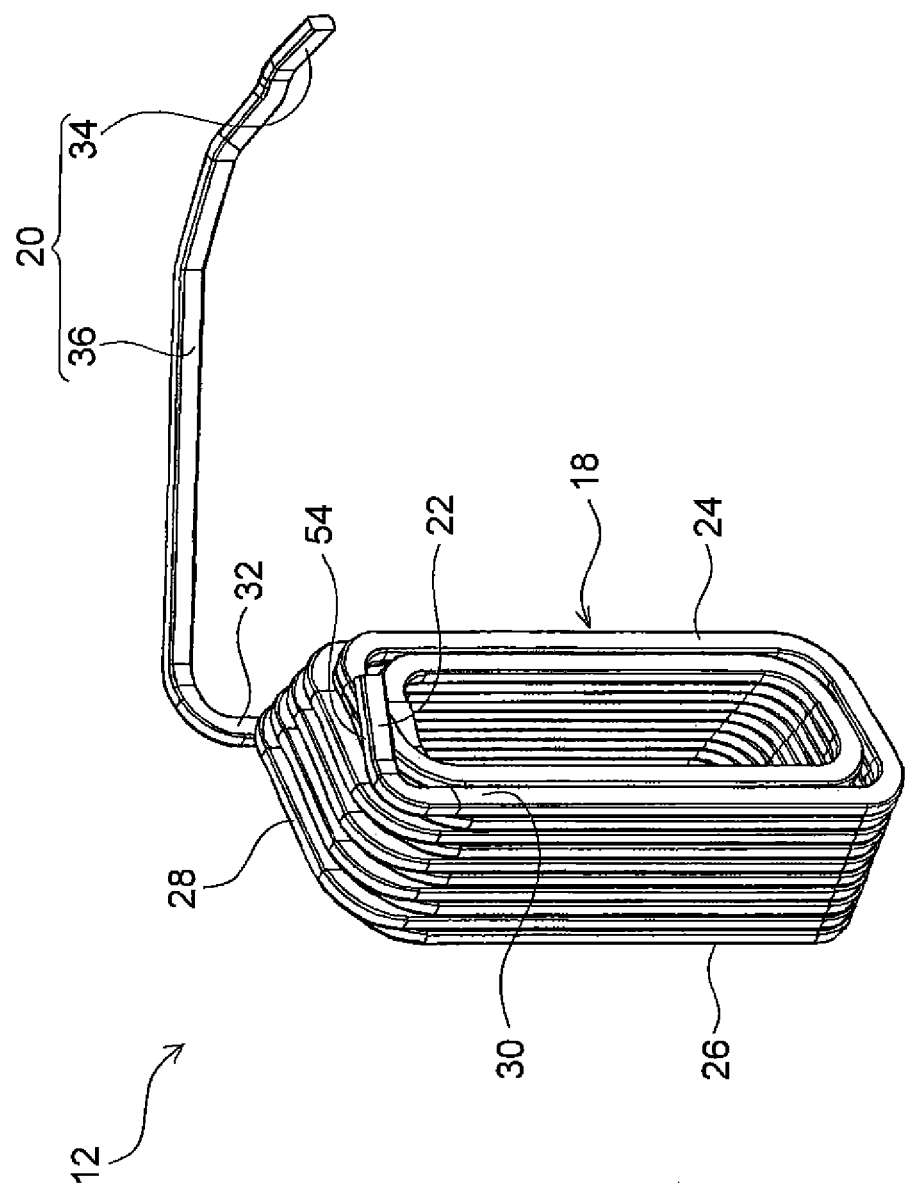
FIG. 13 is a view (perspective view) showing a single coil according to the modification of the second embodiment.

As a modification of the second embodiment, as shown in FIGS. 12 and 13, a stator 2A may be formed in which the bus bar portion 20 is formed by extending the rectangular conductor from the outer end 32 of the winding portion 18, and the terminal portion 22 is formed by extending the rectangular conductor from the inner end 30 of the winding portion 18.

It should be understood that the above embodiments are only examples, the preferred embodiments and are not limited in any way to the above embodiments, and various improvements and modifications can be made without departing from the spirit and scope of the present invention.

DESCRIPTION OF THE REFERENCE NUMERALS

1: Stator
2: Stator
10: Stator Core
12: Coil
14: Back Yoke
16: Tooth
18: Winding Portion
20: Bus Bar Portion
22: Terminal Portion
24: Inner End Face
26: Outer End Face
28: Axial end face
30: Inner End
32: Outer End
34: Joint Portion
36: Connecting Portion
42: Upward Portion

The invention claimed is:

1. A stator which includes
an annular stator core formed integrally in a circumferential direction of the stator core, and
a plurality of coils that are mounted on the stator core and each include a winding portion formed by winding a conductor in a loop shape, a bus bar portion extended from one end of the winding portion, and a terminal portion extended from the other end of the winding portion, and in which
the coils are formed of three phases that are U-phase, V-phase, and W-phase, the stator comprising:
the bus bar portion includes a joint portion that is formed at an end of the bus bar portion and is joined to the terminal portion of a different one of the coils, and a connecting portion that is formed between the joint portion and the winding portion; and
in the coils of each of the three phases that are U-phase, V-phase, and W-phase, a first coil and a second coil that serve as the two coils joined to each other are joined to each other by the joint portion of the bus bar portion of the first coil and the terminal portion of the second coil, and ends of the terminal portions of middle coils that are the coils disposed between the first coil and the second coil are located at a height closer to the stator core than the connecting portion of the first coil in a direction of a central axis of the stator core.

2. The stator according to claim 1, wherein
in the coils of each of the three phases that are U-phase, V-phase, and W-phase, each of the coils is formed such that an end of the terminal portion is located at a height closer to the stator core than the connecting portion in the direction of the central axis of the stator core.

3. The stator according to claim 2, wherein
in the coils of each of the three phases that are U-phase, V-phase, and W-phase, the terminal portion of each of the coils is formed so as to be tilted with the respect to the direction of the central axis of the stator core.

4. The stator according to claim 3, wherein
the joint portion includes a downward portion extending from the connecting portion toward an end face of the stator core, a bottom portion extending from an end of the downward portion along the end face of the stator core, and an upward portion extending from an end of the bottom portion in a direction away from the end face of the stator core.

5. The stator according to claim 4, wherein
the terminal portion is formed inward of an outer end face of the winding portion in a radial direction of the stator core.

6. The stator according to claim 2, wherein
the joint portion includes a downward portion extending from the connecting portion toward an end face of the stator core, a bottom portion extending from an end of the downward portion along the end face of the stator core, and an upward portion extending from an end of the bottom portion in a direction away from the end face of the stator core.

7. The stator according to claim 2, wherein
the terminal portion is formed inward of an outer end face of the winding portion in a radial direction of the stator core.

8. The stator according to claim 3, wherein
the terminal portion is formed inward of an outer end face of the winding portion in a radial direction of the stator core.

9. The stator according to claim 6, wherein
the terminal portion is formed inward of an outer end face of the winding portion in a radial direction of the stator core.

10. The stator according to claim 1, wherein
in the coils of each of the three phases that are U-phase, V-phase, and W-phase, the terminal portion of each of the coils is formed so as to be tilted with the respect to the direction of the central axis of the stator core.

11. The stator according to claim 10, wherein
the joint portion includes a downward portion extending from the connecting portion toward an end face of the stator core, a bottom portion extending from an end of the downward portion along the end face of the stator core, and an upward portion extending from an end of the bottom portion in a direction away from the end face of the stator core.

12. The stator according to claim 10, wherein
the terminal portion is formed inward of an outer end face of the winding portion in a radial direction of the stator core.

13. The stator according to claim 11, wherein
the terminal portion is formed inward of an outer end face of the winding portion in a radial direction of the stator core.

14. The stator according to claim 1, wherein
the joint portion includes a downward portion extending from the connecting portion toward an end face of the stator core, a bottom portion extending from an end of the downward portion along the end face of the stator core, and an upward portion extending from an end of the bottom portion in a direction away from the end face of the stator core.

15. The stator according to claim 14, wherein
the terminal portion is formed inward of an outer end face of the winding portion in a radial direction of the stator core.

16. The stator according to claim 1, wherein
the terminal portion is formed inward of an outer end face of the winding portion in a radial direction of the stator core.

17. The stator according to claim 1, wherein
the terminal portion is formed such that an end of the terminal portion is located at a height closer to the stator core than an axial end face of the winding portion in the direction of the central axis of the stator core.

18. The stator according to claim 1, wherein
the bus bar portion is extended from an end of the winding portion that is an end on an inner side in the radial direction of the stator core; and
the terminal portion is extended from an end of the winding portion that is an end on an outer side in the radial direction of the stator core.

19. A method of manufacturing a stator which includes
forming an annular stator core integrally in a circumferential direction of the stator core, and
mounting a plurality of coils on the stator core, each of the coils include a winding portion formed by winding a conductor in a loop shape, a bus bar portion extended from one end of the winding portion, and a terminal portion extended from the other end of the winding portion, and in which
the coils are formed of three phases, that is, U-phase, V-phase, and W-phase, the method comprising:
when manufacturing the stator in which the bus bar portion includes a joint portion that is formed at an end of the bus bar portion and is joined to the terminal portion of a different one of the coils, and a connecting portion that is formed between the joint portion and the winding portion, and
in the coils of each of the three phases that are U-phase, V-phase, and W-phase, a first coil and a second coil that serve as the two coils joined to each other are joined to each other by the joint portion of the bus bar portion of the first coil and the terminal portion of the second coil, and ends of the terminal portions of middle coils that are the coils disposed between the first coil and the second coil are located at a height closer to the stator core than the connecting portion of the first coil in a direction of a central axis of the stator core,
inserting the coils into slots of the stator core from an inner side of an inner periphery of the stator core.

20. A stator which includes:
an annular stator core configured with a back yoke formed in an annular shape with a plurality of teeth formed to protrude in a radial direction of the stator core, the stator core being formed integrally in a circumferential direction of the stator core, and
a plurality of wound coils that are mounted on each of the plurality of teeth of the stator core, and each coil include a winding portion formed by winding a conductor in a loop shape, a bus bar portion extended from one end of the winding portion, and a terminal portion extended from the other end of the winding portion, and in which
the coils are formed of three phases that are U-phase, V-phase, and W-phase, the stator comprising:
the bus bar portion includes a joint portion that is formed at an end of the bus bar portion and is joined to the terminal portion of a different one of the coils, and a connecting portion that is formed between the joint portion and the winding portion; and
in the coils of each of the three phases that are U-phase, V-phase, and W-phase, a first coil and a second coil that serve as the two coils of a same phase are joined to each other by the joint portion of the bus bar portion of the first coil and the terminal portion of the second coil, and ends of the terminal portions of middle coils, that are coils disposed between the first coil and the second coil and the middle coils are of a different phase from the phase of the first and second coil, are located at a height closer to the stator core than the connecting portion of the first coil in a direction of a central axis of the stator core.

21. A method of manufacturing a stator which includes
forming an annular stator core integrally in a circumferential direction of the stator core,
forming a plurality of coils, each of the coils formed by winding a conductor in a predetermined shape, and
mounting the plurality of coils on the stator core by inserting each coil into a corresponding slot of the stator core from an inner side of an inner periphery of the stator core by passing the coil under a connecting portion of a coil that has been previously inserted, wherein
the predetermined shape of each of the coils includes a winding portion formed by winding a conductor in a loop shape, a bus bar portion extended from one end of the winding portion, and a terminal portion extended from the other end of the winding portion, and in which
the coils are formed of three phases, that is, U-phase, V-phase, and W-phase, the method comprising:
when manufacturing the stator in which the bus bar portion includes a joint portion that is formed at an end of the bus bar portion and is joined to the terminal portion of a different one of the coils, and a connecting portion that is formed between the joint portion and the winding portion, and
in the coils of each of the three phases that are U-phase, V-phase, and W-phase, a first coil and a second coil that serve as the two coils joined to each other are joined to each other by the joint portion of the bus bar portion of the first coil and the terminal portion of the second coil, and ends of the terminal portions of middle coils that are the coils disposed between the first coil and the second coil are located at a height closer to the stator core than the connecting portion of the first coil in a direction of a central axis of the stator core.

* * * * *